United States Patent
Branlard et al.

(10) Patent No.: US 8,361,342 B2
(45) Date of Patent: Jan. 29, 2013

(54) TWO-LAYER COMPACTED SOLID PRODUCT FOR WATER POTABILIZATION AND PREPARATION METHOD

(75) Inventors: Paul Branlard, Lyons (FR); Gilles Rubinstenn, Paris (FR)

(73) Assignee: Eurotab (FR)

( * ) Notice: Subject to any disclaimer, the term of this patent is extended or adjusted under 35 U.S.C. 154(b) by 833 days.

(21) Appl. No.: 12/444,541

(22) PCT Filed: Oct. 4, 2007

(86) PCT No.: PCT/FR2007/001621
§ 371 (c)(1),
(2), (4) Date: Aug. 19, 2009

(87) PCT Pub. No.: WO2008/040884
PCT Pub. Date: Apr. 10, 2008

(65) Prior Publication Data
US 2010/0025626 A1    Feb. 4, 2010

(30) Foreign Application Priority Data

Oct. 5, 2006    (FR) ..................................... 06 08751

(51) Int. Cl.
C02F 5/08    (2006.01)
C02F 5/10    (2006.01)
C02F 1/52    (2006.01)
C02F 1/56    (2006.01)
C02F 1/76    (2006.01)

(52) U.S. Cl. ........ 252/176; 252/175; 252/181; 210/223; 210/667; 210/706; 210/721; 210/723; 210/728; 210/730; 210/731; 210/732; 210/733; 210/756; 510/224; 510/228; 510/230; 510/231; 510/233; 510/375; 510/378; 510/402; 156/288

(58) Field of Classification Search ................... 252/175, 252/176, 181; 210/223, 667, 706, 721, 723, 210/728, 730, 731, 732, 733, 756; 510/224, 510/228, 230, 231, 233, 375, 378, 404; 156/288
See application file for complete search history.

(56) References Cited

U.S. PATENT DOCUMENTS

| | | | | |
|---|---|---|---|---|
| 3,873,685 | A * | 3/1975 | Kibbel et al. ................. | 424/405 |
| 5,213,794 | A * | 5/1993 | Fritsch et al. ................ | 424/78.01 |
| 5,607,552 | A * | 3/1997 | Andersson et al. ........ | 162/181.6 |
| 5,681,475 | A * | 10/1997 | Lamensdorf et al. ........ | 210/666 |
| 6,103,065 | A * | 8/2000 | Humphreys et al. ....... | 162/181.8 |
| 6,372,255 | B1 * | 4/2002 | Saslawski et al. ............ | 424/473 |
| 2004/0026657 | A1* | 2/2004 | Souter et al. .................. | 252/181 |
| 2004/0217326 | A1* | 11/2004 | Souter et al. .................. | 252/179 |
| 2008/0039317 | A1* | 2/2008 | Branlard et al. ............. | 502/406 |
| 2011/0236450 | A1* | 9/2011 | Scheuing et al. ............ | 424/405 |
| 2011/0236582 | A1* | 9/2011 | Scheuing et al. ............ | 427/331 |

FOREIGN PATENT DOCUMENTS

| WO | 96/32194 | 10/1996 |
|---|---|---|
| WO | 03/011769 | 2/2003 |
| WO | 2006/016073 | 2/2006 |
| WO | 2006/088901 | 8/2006 |

OTHER PUBLICATIONS

International Search Report; PCT/FR2007/001621; Mar. 20, 2008.

* cited by examiner

Primary Examiner — Joseph D Anthony
(74) Attorney, Agent, or Firm — Cantor Colburn LLP

(57) ABSTRACT

The present invention relates to a compacted solid product for water purification comprising:—at least a first layer comprising at least a coagulant/flocculant system comprising at least one polyvalent inorganic salt, at least one water-soluble cationic polymer and at least one high-molecular-weight anionic polymer,—at least a second layer comprising at least one disinfectant that releases active chlorine on contact with water, characterized in that said coagulant/flocculant system moreover comprises a sodium alginate. The invention also relates to the method for preparing such a product.

30 Claims, No Drawings ated solid product, an arrangement of the coagulant-flocculant system in the first layer and the disinfectant in the second layer.

TWO-LAYER COMPACTED SOLID PRODUCT FOR WATER POTABILIZATION AND PREPARATION METHOD

TECHNICAL FIELD OF THE INVENTION

The present invention relates to a compacted solid product for the purification of water that can be used, in particular, in water having a particularly cold temperature.

BRIEF DISCUSSION OF RELATED ART

The treatment of water for the purpose of purifying it and/or rendering it drinkable forms the subject of much research and is a subject vital to mankind.

In parallel with the development of large-scale purification plants for the treatment of water from large urban areas, in particular in industrialized countries, a search is also under way to develop simple means for the effective and rapid treatment of a predetermined volume of water with the aim, for example, of rendering water from a natural water source drinkable. These natural waters may, for example, be the result of the thawing of snow or ice or water courses located at high altitude: in this case, these waters generally have a particularly low temperature, for example below 10° C.

Products for disinfecting waters originating from natural water sources such as ponds or wells have already been proposed.

The purification of any water, in particular for the purpose of rendering it drinkable, employs several treatments and in particular a clarification step, intended to separate minimal and organic matter liable to be suspended in the water, and a disinfection step, intended to kill the bacteria and viruses present in the water. Clarification is generally carried out by flocculation and/or coagulation then sedimentation and filtration of the organic substances. Disinfection is generally carried out by release of bactericidal available chlorine.

Furthermore, for practical handling and storage reasons, and in view of the desired use, it is sought to have a water potabilization means in the form of a solid composition, such as for example a pellet or a tablet, preferably predosed, which can be simply dropped into the predetermined volume of water to be purified without it being necessary to use more complex means than simple occasional stirring.

Solid compositions for clarifying and disinfecting water are already known.

Thus, document WO 2006/016073 describes compositions in tablet form for purifying a predetermined volume of water, comprising, inter alia, a flocculating agent and a disinfectant that releases available chlorine.

However, it has been observed that the effectiveness of such tablets is not completely satisfactory when the water to be treated is below about ten degrees Celsius. Specifically, it has been observed that at low temperature the flocs formed are particularly fine and their settling rate is low. It then appears that the clarification of a very cold turbid water is carried out over a time interval which may be considered to be too long in order to be effective since the release of available chlorine is carried out in a not inconsiderable proportion whilst the flocs, chlorine consumers, are still in suspension.

However, according to the WHO (World Health Organization), it is necessary to maintain a concentration of available chlorine at least equal to 0.50 mg/l in the water in order to have a disinfected water. If the chlorination is too premature with respect to the removal of the organic matter in suspension that consumes chlorine, there is a risk of a lack of chlorine, which is then consumed by this organic matter, for ensuring the disinfection of the water. The presence of a minimum concentration of available chlorine in the treated water is a condition necessary for its disinfection and therefore its potability.

Thus, there is a need for a composition that is simple to handle, to store and to use, which would make it possible to clarify, via flocculation, and to disinfect, via bactericidal action, a predetermined volume of a particularly cold water, for example a water for which the temperature is less than or equal to 10° C., without it being necessary to consume large amounts of disinfectant.

Document WO 02/00557 describes compositions for the purification of water comprising at least one coagulant, at least one coagulation aid and at least one flocculant.

However, there remains the need for a product which would make it possible to carry out the clarification step, via flocculation and settling, of a particularly cold water, for example one for which the temperature is less than or equal to 10° C., in a rapid manner, and in any case sufficiently rapidly in order not to compromise the effectiveness of the disinfectant by the presence of organic matter in suspension when this disinfectant is released.

BRIEF SUMMARY OF THE INVENTION

The present invention aims to solve this problem by providing a single solid composition, in particular in the form of a pellet or of a tablet, capable of effectively clarifying and disinfecting any water which may be very cold without overconsumption of disinfectant liable to impair its organoleptic quality.

DETAILED DESCRIPTION OF THE INVENTION

In particular, the Applicant has discovered that by introducing, according to a specific composition, a particular anionic compound, namely a sodium alginate, into a water purification product, it was possible to carry out the clarification step of any natural water, and in particular of a very cold water, in a rapid manner and therefore to optimize subsequent disinfection of this water.

A first subject of the invention is a compacted solid product for the purification of water comprising:
  at least one first layer comprising at least one coagulant-flocculant system comprising at least one polyvalent inorganic salt, at least one water-soluble cationic polymer and at least one high molecular weight anionic polymer;
  at least one second layer comprising at least one disinfectant that releases available chlorine in contact with water,
characterized in that said coagulant-flocculant system also comprises a sodium alginate.

The product according to the invention makes it possible to effectively clarify and disinfect any water, regardless of its temperature, its source and its state. Thus, water from a pond, from a well, and more particularly cold water from high plateaus or resulting from the thawing of snow or ice, may be purified with the product according to the invention.

By virtue of the specific arrangement and the respective particular compositions of its two layers, the product according to the invention makes it possible to release, in a first step, the coagulating-flocculating agent, which precipitates the suspended mineral and organic substances then, in a second step, while the flocs formed by the precipitation of the organic substances and of the flocculating agent are separated by settling, the disinfecting agent, for a biocidal action targeting the bacteria present in the water.

In particular, by virtue of the particular composition of the first layer, the flocs resulting from the precipitation of the mineral and organic substances in suspension settle rapidly and, in any case, before the disinfecting agent has released a substantial amount of available chlorine.

The combination of the coagulating and flocculating agents makes it possible to obtain flocs of large size and of high density, so that after the settling, the flocs agglomerate and form a bed at the bottom of the container, which bed is not easily redispersed when the clarified water is drawn off.

Thus, the available chlorine is released into an already clarified water and its bactericidal action is not hindered by the presence of organic matter that consumes a lot of chlorine.

The product according to the invention is ecological and economic: it does not consume more disinfectant than necessary. Due to its solid form, it is simple and practical to use, to store, to transport and to handle.

By virtue of the product according to the invention, filtration of the water is not absolutely necessary.

The product according to the invention is a compacted solid product comprising at least two layers.

The first layer of the product according to the invention comprises at least one coagulant-flocculant system.

The expression "coagulant-flocculant system" is understood, according to the present application, to mean a system for which the compound or compounds will react with the suspended mineral and organic substances present in the water to be purified giving rise to their precipitation in the form of flocs, that is to say of solids having a density greater than 1, which will, after settling, collect and form a sediment at the bottom of the volume of water to be purified. The coagulant-flocculant system thus makes it possible to clarify the water to be treated.

The coagulant-flocculant system of the product according to the invention comprises at least one polyvalent inorganic salt, at least one water-soluble cationic polymer, at least one high molecular weight anionic polymer and at least one sodium alginate.

The combination of a polyvalent inorganic salt, for example a trivalent metal salt, which is a coagulant, and of a water-soluble cationic polymer, which is a flocculant, enables a flocculation and an aggregation of the flocs formed by precipitation.

Surprisingly, the combination of a very high molecular weight anionic polymer and of a sodium alginate with the polyvalent inorganic salt and the water-soluble cationic polymer described above leads, even in very cold water, for example water having a temperature less than or equal to 10° C., to a consequent enlarging of the flocs formed and therefore an accelerated settling of these flocs.

One sodium alginate that is particularly suitable for the present invention is the product sold under the trade name PROTANAL® LF200 alginate by FMC BioPolymer.

Preferably, the sodium alginate is present in said first layer at a content ranging from 0.1 to 10% by weight, more preferably ranging from 2 to 5% by weight, relative to the weight of said first layer.

Preferably, the sodium alginate content in the water to be treated is from 2 to 10 ppm.

In one embodiment of the invention, said high molecular weight anionic polymer has a molecular weight greater than or equal to 5 000 000 D, and preferably greater than or equal to 10 000 000 D.

Preferably, said high molecular weight anionic polymer is present in said first layer at a content ranging from 0.01 to 0.4% by weight relative to the weight of said first layer.

Preferably, said high molecular weight anionic polymer is a water-soluble copolymer of sodium acrylate. Water-soluble sodium acrylate copolymers that are particularly suitable for the present invention are the products sold under the trade name "FLOPAM® AN 934 by SNF and under the trade name MAGNAFLOC® LT 27 by CIBA.

Preferably, the content of sodium acrylate copolymers in the water to be treated is from 0.1 to 0.5 ppm.

Preferably, the polyvalent inorganic salt is a trivalent metal salt chosen from ferric sulfate, ferric chloride, aluminum sulfate, polyaluminum hydroxychloride and mixtures thereof. More preferably, the trivalent metal salt is hydrated ferric sulfate. These compounds are well known and commercially available.

Preferably, the hydrated ferric sulfate is present in the volume of water to be treated at a content ranging from 10 to 30 ppm expressed as Fe.

Preferably, the water-soluble cationic polymer is a water-soluble cationic polymer of diallyldimethylammonium chloride, preferably of very high molecular weight, for example having a molecular weight greater than or equal to 500 000 D. One compound that is particularly suitable for the present invention is the diallyldimethylammonium chloride polymer sold in powder form under the trade name FLOQUAT® DB45 PWG by SNF.

Preferably, the cationic polymer is present in the volume of water to be treated at a content ranging from 1 to 2 ppm.

In one preferred embodiment of the invention, the first layer also comprises micronized sand. The addition of micronized sand into the first layer makes it possible to make the flocs denser and thus to accelerate their settling rate.

In one preferred embodiment of the invention, the first layer comprises a moisture absorber, such as for example magnesium trisilicate. Such a moisture absorber facilitates the pelleting of the product according to the invention during its manufacture, in the presence of a high relative humidity of the atmosphere surrounding the pelleting machine. Preferably, the magnesium trisilicate is present in the first layer at a content less than or equal to 3% by weight, more preferably less than or equal to 1.5% by weight, relative to the weight of the first layer.

Preferably, the first layer also comprises a disintegrating system. The expression "disintegrating system" is understood, according to the present invention, to mean a system having a compound or compounds which will react immediately on contact with water to result in the rapid disintegration, preferably in less than one minute, more preferably in less than 30 seconds, of the first layer.

Preferably, the disintegrating system comprises at least one disintegrating agent chosen from cellulose and derivatives thereof, effervescent combinations of a water-soluble polyorganic acid and of a weak base, and mixtures thereof.

In one embodiment of the invention, the disintegrating agent is a cellulose, for example amorphous or crystalline cellulose. One example of amorphous cellulose that is suitable for the present invention is the product sold under the trade name ARBOCEL® A300 by J. Rettenmaier & Söhne. One example of microcrystalline cellulose that is suitable for the present invention is the product sold under the trade name VIVAPUR® 200 by J. Rettenmaier & Söhne.

In another embodiment of the invention, the disintegrating agent is formed from the effervescent combination of a weak base and of the trivalent metal salt described above. Preferably, the weak base is sodium bicarbonate.

Preferably, the disintegrating agent is present in the first layer at a content less than or equal to 50% by weight, preferably at a content ranging from 20% to 40% by weight, relative to the weight of the first layer.

Specifically, it has been observed that above a concentration of 50% by weight of disintegrating agent in the first layer, the settling of the flocs formed is greatly slowed down, delaying the clarification of the water to be treated.

The combination of a flocculating system and of a disintegrating system as defined above in the first layer of the product according to the invention makes it possible to rapidly diffuse, in the water to be treated, the coagulants and flocculants of this first layer in contact with water, and this taking place, due to the immediate disintegration, preferably in less than one minute and more preferably in less than thirty seconds. Thus, the clarification of the water can take place without delay. The sedimentation of the precipitating materials is carried out in a few minutes and leads to water being obtained that has a very low turbidity.

The second layer of the product according to the invention comprises at least one disinfectant that releases available chlorine on contact with water.

Preferably, the second layer also comprises at least one excipient for the disinfectant, said excipient releasing the disinfectant into the water at a controlled rate such that the excipient-disinfectant combination releases from 0.1 to 10 mg/l of available chlorine per hour.

Thus, by virtue of the product according to the invention, the release of available chlorine is controlled, regardless of the intrinsic dissolution rate of the disinfectant in water. Thus, any disinfectant may be used and this results in a simplicity of the manufacture of the product.

The disinfectant that releases available chlorine can be any chlorine derivative known to release available chlorine, regardless of the intrinsic dissolution rate of this derivative in water. Preferably, the disinfectant is chosen from the sodium salt of N-chloro-4-methylbenzenesulfonamide in the anhydrous or dihydrate form, the sodium salt of 1,3-dichloro-s-triazine-2,4,6-trione in the anhydrous or dihydrate form, and mixtures thereof. More preferably, the disinfectant is the sodium salt of 1,3-dichloro-s-triazine-2,4,6-trione in the dihydrate form.

These compounds are well known and are commercially available from OXYCHEM.

The term "excipient" is understood, within the meaning of the present application, to mean one or more compounds other than the disinfectant which act as a carrier for this disinfectant and which are furthermore chemically inert with respect to the disinfectant, that is to say which do not react with it, both when the product of the invention is in the stored form and when it is used in the water to be purified.

Preferably, the excipient of the second layer of the product according to the invention releases the disinfectant into the water at a controlled rate such that the excipient-disinfectant combination releases from 0.1 to 10 mg/l of available chlorine per hour, preferably at a rate ranging from 0.2 to 5 mg/l of available chlorine per hour. Thus, the diffusion of the disinfectant into the water to be treated is gradual and controlled and does not interfere with the clarification step.

In one embodiment of the invention, the excipient is chosen from water-soluble compounds that dissolve slowly. Thus, preferably, the excipient is chosen from gum arabic or acacia, gum tragacanth, locust bean gum, xanthan gum, guar gum and mixtures thereof.

Thus, during the gradual dissolution of the excipient in the water, the disinfectant is gradually released and diffuses into the water to be treated.

In another embodiment, the excipient is chosen from hydrophilic insoluble compounds that swell in water. Thus, preferably, the excipient is chosen from modified starches, gelatinized starches, potato flour, and mixtures thereof. An example of a gelatinized starch that is particularly suitable for the present invention is the product sold under the trade name LYCATAB® PGS by Roquette.

In the case where the excipient is such a hydrophilic insoluble compound that swells in water, the gradual release of the disinfectant into the water to be treated takes place via the diffusion of the water within the insoluble excipient.

Thus, by virtue of the presence of the particular excipient that controls the release of the disinfectant in the second layer and owing to the fact that this second layer is different from the first layer, the disinfectant is not entrained with the coagulating and flocculating agents of the first layer, which diffuse very rapidly into the water owing to the disintegrating system. The disinfectant is therefore not prematurely consumed by the substances in suspension before the latter are precipitated and form sediment at the bottom of the volume of water to be treated.

The second layer of the product according to the invention remains intact during the first phase of the treatment, that is to say during the clarification, which generally lasts less than one minute, or even less than thirty seconds. The second layer may then carry out its disinfecting role by gradual and continuous release, over a few hours, of the disinfectant which will be able to act on the pathogenic microorganisms liable to be present in the water to be treated, without interfering with the flocs formed during the first phase, that are concentrated at the bottom of the volume to be treated.

Preferably, the second layer comprises an effervescent system. This is because an effervescent system facilitates the diffusion of the water leading to the release of available chlorine.

Preferably, the effervescent system comprises a mixture of a weak base, such as sodium bicarbonate, and of a water-soluble polyorganic acid preferably chosen from citric acid, malic acid, tartaric acid, malonic acid, fumaric acid, maleic acid, adipic acid, succinic acid and mixtures thereof.

Preferably, the effervescent system is present in the second layer at a content less than or equal to 50% by weight, preferably at a content ranging from 10% to 40% by weight, relative to the weight of the second layer.

In one preferred embodiment of the invention, the density of the second layer is strictly less than 1, and preferably ranges from 0.70 to 0.95. Thus, at the end of the first phase, when the first layer has completely disintegrated, the second layer rises to the surface of the water to be treated and floats. It is then totally remote from the flocs formed during the first phase and the gradual and continuous diffusion of the disinfectant may take place under the best conditions and without excessive and pointless consumption of disinfecting agent.

The product according to the invention may comprise additional compounds such as colorants, fragrances/flavors, etc.

Preferably, all the compounds constituting the product according to the invention are of food-grade quality, that is to say they can be ingested by man without endangering his health.

The product according to the invention may have any geometric shape possible. In one embodiment of the invention, the product is in the form of a pellet or of a tablet and the two layers are adjacent.

In another embodiment of the invention, it is in the form of a compressed tablet or a roll, the first layer coating the second layer which forms a core.

Another subject of the invention is a process for the preparation of a compacted solid product for the purification of water comprising at least one first layer and at least one second layer, characterized in that it comprises the following steps:

a°) a first pulverulent mixture is prepared comprising at least one coagulant-flocculant system comprising at least one polyvalent inorganic salt, at least one water-soluble cationic polymer, at least one high molecular weight anionic polymer and at least one sodium alginate;

b°) a second pulverulent mixture is prepared comprising at least one disinfectant that releases available chlorine in contact with water;

c°) the mixture obtained in b°) is precompacted in a pelleting machine;

d°) the mixture obtained in a°) is added to the pelleting machine and the combined mixture is compacted in order to obtain a two-layer product.

The product according to the invention is preferably prepared by direct compression using a pelleting machine. This process is known.

Preferably, the first pulverulent mixture also comprises at least one moisture absorber, for example magnesium trisilicate. Such a moisture absorber facilitates the compacting of step d°) of the process for manufacturing the product according to the invention, in the presence of a high relative humidity of the atmosphere surrounding the pelleting machine.

In another embodiment, the product according to the invention may comprise, besides the first and second layer, one or more additional layers, such as for example an intermediate layer that separates the first and the second layer or else an outer layer.

The degree of compaction of the first layer and that of the second layer are adjusted depending on the respective dissolution rates desired for each of these layers within the water to be treated.

The present invention will now be illustrated using the following examples.

EXAMPLES

The meaning of the terms used in the following examples is given below:

Ferric sulfate heptahydrate: in powder form, sold by Dr. Lohmann.

FLOQUAT® DB45 PWG: water-soluble cationic polymer of diallyldimethylammonium chloride in powder form, having a molecular weight close to 500 000 D, sold by SNF.

DCCNa.2$H_2O$: sodium salt of 1,3-dichloro-s-triazine-2,4,6-trione in the dihydrate form, also known as sodium dichloroisocyanurate in the dihydrate form, in powder form.

LYCATAB® PGS: gelatinized starch, in powder form, sold by Roquette.

VIVAPUR® 200: microcrystalline cellulose in powder form sold by J. Rettenmaier & Söhne FLOPAM® AN 934 PWG: anionic copolymer of sodium acrylate having a molecular weight close to 15 000 000 D, sold by SNF.

PROTANAL® LF200 alginate: sodium alginate, having a viscosity close to 200 to 400 mPa·s at 1% in aqueous solution, in powder form, sold by FMC BioPolymer.

MACROSORB® MS33 F: magnesium trisilicate in powder form, sold by INEOS Silicas.

Example 1 (According to the Invention)

This example illustrates the invention in the case where the temperature of the water to be treated is around 8° C.

Use was made of 200 liters of turbid water (around 400 NTU) prepared from river water having a turbidity of 15 NTU, to which an argillaceous earth was added in order to attain this turbidity.

According to the WHO recommendations, water is considered non-turbid if its turbidity is strictly below 5 NTU.

The pH of the water to be treated was close to 7.2.

For the purpose of treating this 200-liter volume of turbid water, a 36.7 g two-layer pellet was prepared, the first layer providing the clarification being known as layer A and weighing 26.2 g, the second layer providing the disinfection of the water to be treated being known as layer B and weighing 10.5 g. The diameter of the pellet was 45 mm. The pellet was prepared by direct compression. The composition of the layers and the resulting amount of each ingredient in the volume of water to be treated are given below:

| Layer A composition | g in layer A | mg/l of water to be treated |
| --- | --- | --- |
| Ferric sulfate heptahydrate | 9.7 | 48.5* |
| FLOQUAT ® DB 45 PWG | 0.4 | 2.0 |
| VIVAPUR ® 200 | 7.0 | 35.0 |
| Sodium bicarbonate | 8.0 | 40.0 |
| FLOPAM ® AN 934 | 0.1 | 0.5 |
| Sodium alginate | 1.0 | 5.0 |

*corresponds to 10 mg/l expressed as Fe.

| Layer B composition | g in layer B | mg/l of water to be treated |
| --- | --- | --- |
| LYCATAB ® PGS | 6.0 | 30.0 |
| Adipic acid | 1.4 | 7.0 |
| Sodium bicarbonate | 2.1 | 10.5 |
| DCCNa•2$H_2O$ | 1.0 | 5.0 |

The two-layer pellet was introduced into the water, with manual stirring for three minutes. The pellet fell to the bottom of the container and layer A of the pellet disintegrated via effervescence in around twenty seconds.

Flocs formed rapidly in four minutes.

The stirring was stopped and the suspended matter was left to settle. Settling of the flocs took place over twenty minutes. The remaining portion of the pellet (layer B) rose to the surface, floated and remained at the surface. It thus released the available chlorine in 90 minutes at 15° C.

The amount of available chlorine measured in the water, after decanting without disturbing the settled solids deposited at the bottom of the container, then agitation of the water recovered, was 0.6 mg/l, two hours after stopping the stirring.

The final turbidity of the clarified water was 5 NTU. The amount of Fe measured was 0.2 mg/l. Such a residual amount of Fe is allowed by the WHO and does not present a danger for human health.

Example 2 (According to the Invention)

This example illustrates the invention in the case where the temperature of the water is around +2° C.

Use was made of 200 liters of turbid water having a turbidity of 450 NTU.

The composition of the two-layer pellet and the procedure followed for the treatment of the water were the same as in example 1.

The flocs formed in ten minutes. Settling of the flocs took place in thirty minutes.

The final amount of available chlorine measured in the clarified and agitated water was 0.6 mg/l measured after 2 hours and thirty minutes. The final turbidity was 7 NTU. The amount of Fe measured was 0.3 mg/l.

Example 3 (According to the Invention)

This example illustrates the invention in the case where the temperature of the water is around +25° C.

200 liters of turbid water having a turbidity of 150 NTU were used.

The composition of the two-layer pellet and the procedure followed for the treatment of the water were the same as in example 1.

The flocs formed in two minutes.

Settling of the flocs took place in 15 minutes and the final amount of available chlorine measured in the clarified and agitated water was 0.8 mg/l measured after 30 minutes. The final turbidity was 5 NTU. The residual amount of Fe measured was 0.2 mg/l.

Example 4 (According to the Invention)

This example illustrates the invention in the case where the temperature of the water is around +8.5° C. and the turbidity of the water is high.

1000 liters of turbid water in a container having a turbidity of 850 NTU were used.

5 pellets were introduced into the container of water to be treated. The composition of the two-layer pellets and the procedure followed for the treatment of the water were the same as in example 1.

Settling of the flocs took place in 60 minutes and the final amount of available chlorine measured in the clarified and agitated water was 0.6 mg/l measured after 90 minutes. The final turbidity was 7 NTU. The residual amount of Fe measured was 0.2 mg/l.

Example 5 (Comparative)

A two-layer pellet was prepared from which the composition of layer A was modified in the sense that it did not contain anionic flocculants:

| Layer A composition | g in layer A | mg/l of water to be treated |
|---|---|---|
| Ferric sulfate heptahydrate | 9.7 | 48.5 |
| FLOQUAT ® DB 45 PWG | 0.6 | 3.0 |
| VIVAPUR ® 200 | 7.0 | 35.0 |
| Sodium bicarbonate | 8.0 | 40.0 |

The composition of layer B was unchanged:

| Layer B composition | g in layer B | mg/l of water to be treated |
|---|---|---|
| LYCATAB ® PGS | 6.0 | 30.0 |
| Adipic acid | 1.4 | 7.0 |
| Sodium bicarbonate | 2.1 | 10.5 |
| DCCNa•2H$_2$O | 1.0 | 5.0 |

200 liters of turbid water having a turbidity of around 520 NTU, at a temperature of +3° C., were used.

After settling for 2 hours, the turbidity of the treated water was 25 NTU and the content of available chlorine was 0.3 mg/l. The amount of Fe measured was 0.8 mg/l.

Example 6

The present example is a comparison between a pellet according to the invention, for which the layer providing clarification known below as A1 comprises sodium alginate, and a pellet from the prior art, for which the layer providing clarification, known below as A2, does not comprise sodium alginate, for the purpose of treating a water at 5° C.

The respective compositions of the layers A1 and A2 are given in the table below:

| Composition of the layer providing clarification | A1 (invention) (g in the layer) | A2 (comparative) (g in the layer) |
|---|---|---|
| Ferric sulfate heptahydrate | 9.7 | 9.7 |
| VIVAPUR ® 200 | 7.0 | 7.0 |
| Sodium bicarbonate | 8.0 | 8.0 |
| Magnesium trisilicate | 0.25 | 0.25 |
| FLOBEAD ® DB45 PWG | 0.4 | 0.4 |
| FLOPAM ® AN 934 | 0.08 | 0.08 |
| Sodium alginate | 1.0 | 0.0 | in which the product FLOBEAD® DB45 PWG is a polymer of diallyldimethylammonium chloride sold by SNF FLOERGER.

200 liters of turbid water (around 400 NTU) were used, prepared from river water having a turbidity of 15 NTU, to which an argillaceous earth was added to attain this turbidity.

The pH of the water to be treated was around 7.2.

For the purpose of treating this 200-liter volume of turbid water, two two-layer pellets were prepared in the same way as in example 1, the layer providing the disinfection of the water to be treated being identical to layer B from example 1, and the layer providing the clarification being the layer A1 for the pellet according to the invention and the layer A2 for the pellet according to the prior art. The water was treated in the manner described in example 1.

The results of the turbidity of the water as a function of the time are given in the table below:

| Pellet comprising | Turbidity at 30 min (NTU) | Turbidity at 60 min (NTU) |
|---|---|---|
| Layer A1 (invention) | 18 | 7 |
| Layer A2 (comparative) | 52 | 30 |

Thus, the pellet according to the invention makes it possible to purify the water more effectively than the pellet according to the prior art.

Example 7

The present example is a comparison between a pellet according to the invention, for which the layer providing the clarification, known below as A3, comprises sodium alginate, and a pellet from the prior art, for which the layer providing the clarification, known below as A4, does not comprise sodium alginate, for the purpose of treating a water at 12° C.

The respective compositions of the layers A3 and A4 are given in the table below:

| Composition of the layer providing clarification | A3 (invention) (g in the layer) | A4 (comparative) (g in the layer) |
|---|---|---|
| Ferric sulfate heptahydrate | 9.7 | 9.7 |
| VIVAPUR ® 200 | 7.0 | 7.0 |
| Sodium bicarbonate | 8.0 | 8.0 |
| Magnesium trisilicate | 0.25 | 0.25 |
| FLOBEAD ® DB45 PWG | 0.4 | 0.4 |
| FLOPAM ® AN 934 | 0.08 | 0.4 |
| Sodium alginate | 3.0 | 0.0 |

200 liters of turbid water (around 400 NTU) were used, prepared from river water having a turbidity of 15 NTU, to which an argillaceous earth was added to attain this turbidity. The pH of the water to be treated was around 7.2.

For the purpose of treating this 200-liter volume of turbid water, two two-layer pellets were prepared in the same way as in example 1, the layer providing the disinfection of the water to be treated being identical to layer B from example 1 and the layer providing the clarification being the layer A3 for the pellet according to the invention and the layer A4 for the pellet according to the prior art. The water was treated in the manner described in example 1.

The results of the turbidity of the water as a function of the time are given in the table below:

| Pellet comprising | Turbidity at 30 min (NTU) | Turbidity at 60 min (NTU) |
|---|---|---|
| Layer A3 (invention) | 8 | 7 |
| Layer A4 (comparative) | 25 | 20 |

Thus, the pellet according to the invention makes it possible to purify the water more effectively than the pellet according to the prior art.

The invention claimed is:

1. A compacted solid product for the purification of water comprising:
   at least one first layer comprising at least one coagulant-flocculant system comprising at least one polyvalent inorganic salt, at least one water-soluble cationic polymer and at least one high molecular weight anionic polymer having a molecular weight greater than or equal to 5 000 000 D;
   at least one second layer comprising at least one disinfectant that releases available chlorine in contact with water,
   wherein said coagulant-flocculant system also comprises a sodium alginate.

2. The product as claimed in claim 1, wherein the sodium alginate is present in said first layer at a content ranging from 0.1 to 10% by weight, relative to the weight of said first layer.

3. The product as claimed in claim 2, wherein said content ranges from 2 to 5% by weight, relative to the weight of said first layer.

4. The product as claimed in claim 1, wherein said molecular weight is greater than or equal to 10 000 000 D.

5. The product as claimed in claim 1, wherein said high molecular weight anionic polymer is present in said first layer at a content ranging from 0.01 to 0.4% by weight relative to the weight of said first layer.

6. The product as claimed in claim 1, wherein said high molecular weight anionic polymer is a water-soluble copolymer of sodium acrylate.

7. The product as claimed in claim 1, wherein the polyvalent inorganic salt is a trivalent metal salt chosen from ferric sulfate, aluminum sulfate, polyaluminum hydroxychloride and mixtures thereof.

8. The product as claimed in claim 1, wherein the water-soluble cationic polymer is a water-soluble cationic polymer of diallyldimethylammonium chloride.

9. The product as claimed in claim 1, wherein the first layer also comprises at least one disintegrating system.

10. The product as claimed in claim 9, wherein the disintegrating system comprises at least one disintegrating agent chosen from cellulose and derivatives thereof, effervescent combinations of a water-soluble polyorganic acid and of a weak base, and mixtures thereof.

11. The product as claimed in claim 10, wherein the disintegrating agent is a cellulose, for example amorphous or crystalline cellulose.

12. The product as claimed in claim 9, wherein the disintegrating system is formed from the effervescent combination of a weak base and of said trivalent metal salt.

13. The product as claimed in claim 12, wherein the weak base is sodium bicarbonate.

14. The product as claimed in claim 10, wherein the disintegrating agent is present in the first layer at a content less than or equal to 50% by weight, preferably at a content ranging from 20% to 40% by weight, relative to the weight of the first layer.

15. The product as claimed in claim 1, wherein said second layer also comprises at least one excipient for the disinfectant, said excipient releasing the disinfectant into the water at a controlled rate such that the excipient-disinfectant combination releases from 0.1 to 10 mg/l of available chlorine per hour, preferably from 0.2 to 5 mg/l of available chlorine per hour.

16. The product as claimed in claim 1, wherein the disinfectant is chosen from the sodium salt of N-chloro-4-methylbenzenesulfonamide in the anhydrous or dihydrate form, the sodium salt of 1,3-dichloro-s-triazine-2,4,6-trione in the anhydrous or dihydrate form, and mixtures thereof.

17. The product as claimed in claim 16, wherein the disinfectant is the sodium salt of 1,3-dichloro-s-triazine-2,4,6-trione in the dihydrate form.

18. The product as claimed in claim 15, wherein the excipient is chosen from water-soluble compounds that dissolve slowly.

19. The product as claimed in claim 18, wherein the excipient is chosen from gum arabic or acacia, gum tragacanth, locust bean gum, xanthan gum, guar gum and mixtures thereof.

20. The product as claimed in claim 15, wherein the excipient is chosen from hydrophilic insoluble compounds that swell in water.

21. The product as claimed in claim 20, wherein the excipient is chosen from modified starches, gelatinized starches, potato flour, and mixtures thereof.

22. The product as claimed in claim 1, wherein said second layer also comprises an effervescent system.

23. The product as claimed in claim 22, wherein the effervescent system comprises a mixture of a weak base, such as sodium bicarbonate, and of a water-soluble polyorganic acid preferably chosen from citric acid, malic acid, tartaric acid, malonic acid, fumaric acid, maleic acid, adipic acid, succinic acid and mixtures thereof.

24. The product as claimed in claim 22, wherein the effervescent system is present in said second layer at a content less than or equal to 50% by weight, relative to the weight of the second layer.

25. The product as claimed in claim 24, wherein said content ranges from 10 to 40% by weight, relative to the weight of the second layer.

26. The product as claimed in claim 1, wherein said first layer also comprises micronized sand.

27. The product as claimed in claim 1, wherein said first layer also comprises a moisture absorber.

28. The product as claimed in claim 27, wherein the moisture absorber is magnesium trisilicate.

29. A process for the preparation of a compacted solid product for the purification of water comprising at least one first layer and at least one second layer, comprising the following steps:

a°) a first pulverulent mixture is prepared comprising at least one coagulant-flocculant system comprising at least one polyvalent inorganic salt, at least one water-soluble cationic polymer, at least one high molecular weight anionic polymer having a molecular weight greater than or equal to 5 000 000 D, and at least one sodium alginate;

b°) a second pulverulent mixture is prepared comprising at least one disinfectant that releases available chlorine in contact with water;

c°) the mixture obtained in b°) is precompacted in a pelleting machine;

d°) the mixture obtained in a°) is added to the pelleting machine and the combined mixture is compacted in order to obtain a two-layer product.

30. The preparation process as claimed in claim 29, wherein said first pulverulent mixture also comprises at least one moisture absorber, for example magnesium trisilicate.

* * * * *